United States Patent [19]
Dunford

[11] Patent Number: 5,573,407
[45] Date of Patent: Nov. 12, 1996

[54] TOILET TRAINING APPARATUS AND METHOD

[76] Inventor: Beverly Dunford, 213 E. 300 South, Logan, Utah 84321

[21] Appl. No.: 547,859

[22] Filed: Oct. 25, 1995

[51] Int. Cl.$^6$ .................................................. G09B 19/00
[52] U.S. Cl. .............................. 434/262; 4/902; 434/236; 446/9
[58] Field of Search ..................... 434/262, 266, 434/236, 238, 267, 268, 237, 107, 110, 258; 446/8, 9, 11, 12; 4/902

[56] References Cited

U.S. PATENT DOCUMENTS

| | | | |
|---|---|---|---|
| 2,768,472 | 10/1956 | Whalen | 446/8 |
| 2,779,128 | 1/1957 | West | 446/8 |
| 2,840,213 | 6/1958 | Gilmour | 434/238 |
| 2,863,603 | 12/1958 | Doupnik | 434/238 |
| 3,035,355 | 5/1962 | Holmes | 434/238 |
| 3,691,980 | 9/1972 | Shastal | 4/902 |
| 4,345,400 | 8/1982 | Katzman et al. | 446/10 |
| 4,783,073 | 11/1988 | Kazumi | 446/9 |
| 4,815,998 | 3/1989 | McGuire | 446/8 |
| 5,013,246 | 5/1991 | Doyle | 434/236 |
| 5,304,084 | 4/1994 | Liao | 446/9 |
| 5,369,820 | 12/1994 | Blount | 4/902 |
| 5,470,235 | 11/1995 | Papaleo | 434/238 |

*Primary Examiner*—Paul J. Hirsch
*Attorney, Agent, or Firm*—Foster & Foster

[57] ABSTRACT

An apparatus and method for training a child to complete a toilet training experience. The invention includes an object placed in close proximity to a toilet appropriate for training the child. The invention also includes a device for emitting a musical sound. Upon successful completion of a toilet training experience, the child is provided a reward token, such as a coin. The child may then place the token into the object, which may comprise a piggy bank. In response to placement of the token into the object, the music emitting device generates a musical sound. The method allows the child to associate the object visually with the training experience and to associate the musical sounds audibly with the training experience.

14 Claims, 2 Drawing Sheets

TOILET TRAINING APPARATUS AND METHOD

TECHNICAL FIELD

This invention relates to methods and devices for use in connection with toilet training for children.

BACKGROUND OF THE INVENTION

One of the major challenges faced by most child care providers and parents is the difficulty of training to a child in the appropriate use of a toilet. Ideally, such methods and devices should result in rapid toilet training of the child. This is not only for convenience, but repeated inappropriate elimination by the child can result in unhealthy and unsanitary conditions, substantial expenses for cleaning and replacing bedding, additional expenses for clothes and diapers, and unpleasant odors. Methods based upon punishment have sometimes been popular. Today, however, it is generally understood that abusive or punitive action does not work well for toilet training. Further, punitive and abusive methods for toilet training can traumatize the child and cause prolonged difficulties in toilet training.

Accordingly, there exists a long-felt need for a method and apparatus for toilet training that can be applied in a positive and loving manner, and that is also effective for teaching a child the proper manner of toilet use.

SUMMARY AND OBJECTS OF THE INVENTION

A primary object of the present invention is to provide a toilet training method that positively reinforces a toilet training experience with a child.

Another primary object of the invention is to provide an apparatus and method for toilet training a child that can be applied without use of abusive or punitive methods.

Still another object of the invention is to provide an apparatus and method for toilet training a child that reduces the time required for toilet training a particular child.

Still another object of the invention is to provide an apparatus and method for toilet training a child that utilizes an object so that the child being toilet trained can associate the object with the training experience.

Still another object of the invention to provide an apparatus and method for toilet training a child that utilizes a musical sound so that the child being toilet trained can associate the musical sound with the training experience.

The present invention involves a method for toilet training a child comprising the steps of providing a toilet appropriate for use by the child, providing an object, such as a decorative container, which includes a sound emitting device responsive to placing a token or other similar device into the object, and allowing the child to place the token-like device into the object. The object is preferably within sufficient proximity of the toilet to allow the child to visually and audibly associate the object with the toilet training experience. Preferably, the step of dispensing the token into the object will constitute a reward after the child completes an appropriate toilet activity. The token will initiate a musical sound that is generated by the sound emitting device.

The present invention also involves an apparatus for toilet training a child comprising a toilet appropriate for use by the child, an object, such as decorative container, that is sufficiently proximate the toilet to allow the child to visually associate the object with the toilet training experience, a reward token for placing into the object, and a music emitting device associated with the object. The device is actuated in response to a reward token being placed into the object.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings.

DETAILED DESCRIPTION OF THE INVENTION

Figure 1:
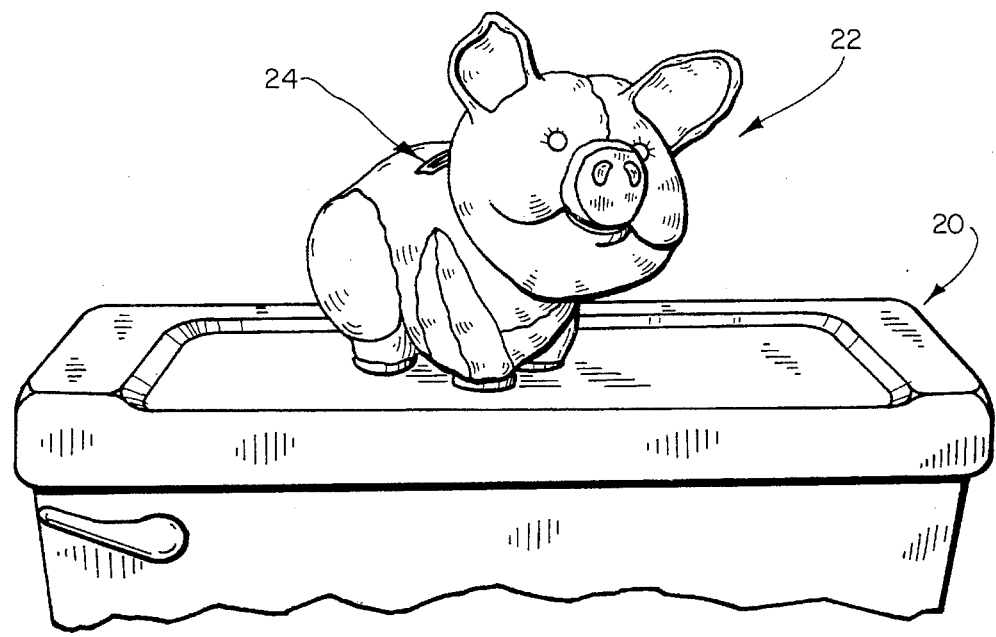
FIG. 1 is a perspective view of an embodiment of the invention, including a decorative object resting upon a conventional toilet.
Figure 2:
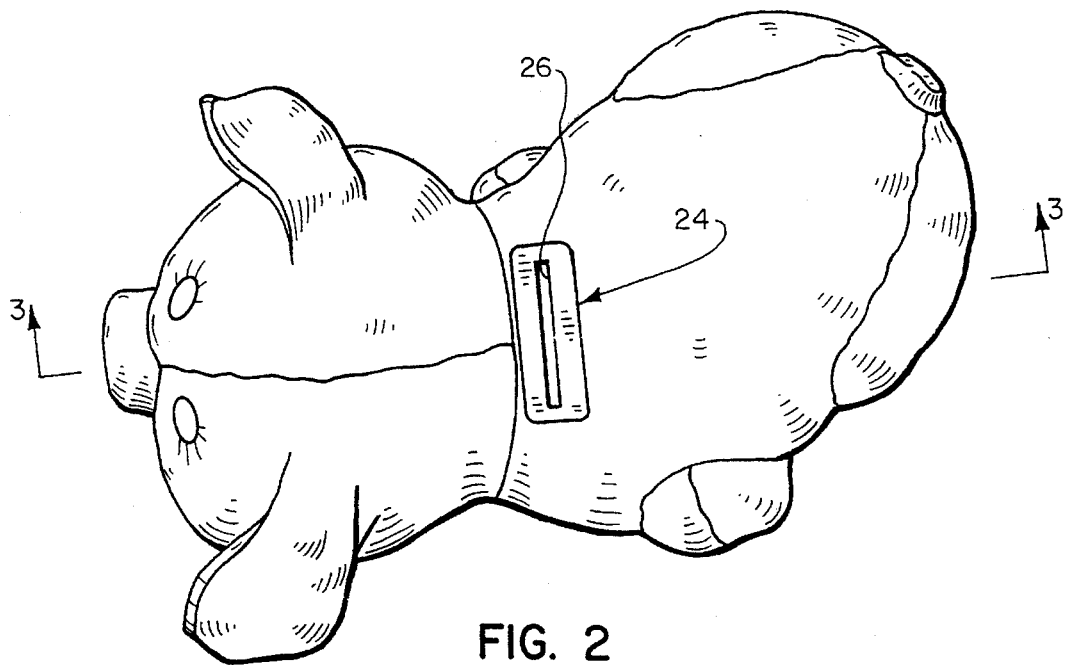
FIG. 2 is a top view of the decorative object of the embodiment of FIG. 1.

FIG. 1 illustrates a preferred embodiment of the invention for carrying out a method of potty training or toilet training a child. Toilet training may take place at any appropriate time during a child's life. An object 22, such as decorative container, is placed on top of an adult toilet 20 (shown only partially in FIG. 1). The object may be any appropriate structure that is configured or decorated in a manner that is immediately recognized by the child and associated in a positive way with the toilet training experience. The object should preferably be separable from the toilet so that the child can hold the object. The object may further be soft and cuddly. The object should preferably evoke pleasurable internal feelings from the child. The object should also be configured and constructed as a container to receive reward tokens and to produce a musical response from placing the tokens into the container. An appropriate object may comprise, without limitation, a so-called piggy-bank in the form of an animal (such as a pig), a cartoon, storybook, or mythical character, a vehicle (such as a car), a machine (such as a robot), or any other suitable object that is pleasing to the child. The decorative object should be in close proximity to the toilet so that the child visually and mentally associates the toilet with the container.

The toilet with which the object is to be utilized may be an adult toilet. It is to be understood, however, that any suitable toilet for training a child may be utilized in connection with the present invention, including a conventional child's potty chair, a smaller toilet seat for placing on top of an adult toilet seat, or any other type of toilet.

Figure 3:
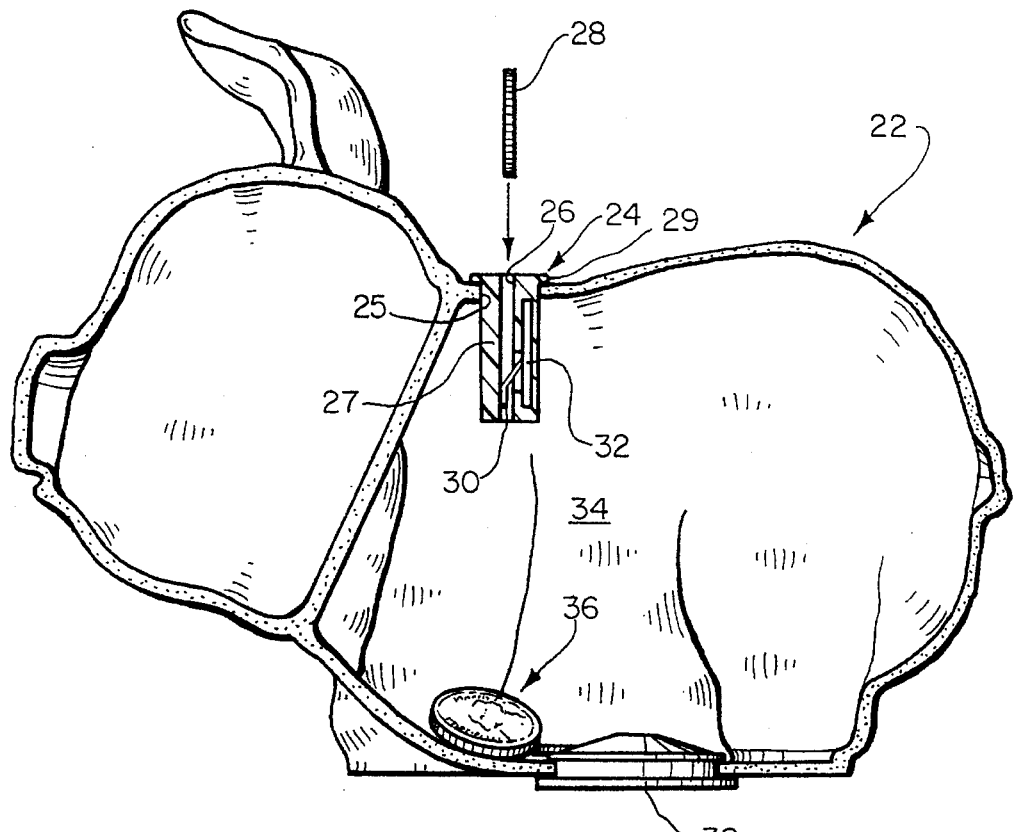
FIG. 3 is a sectional view, taken along the line 3—3 of FIG. 2, of the decorative container of FIG. 1.
Figure 4:
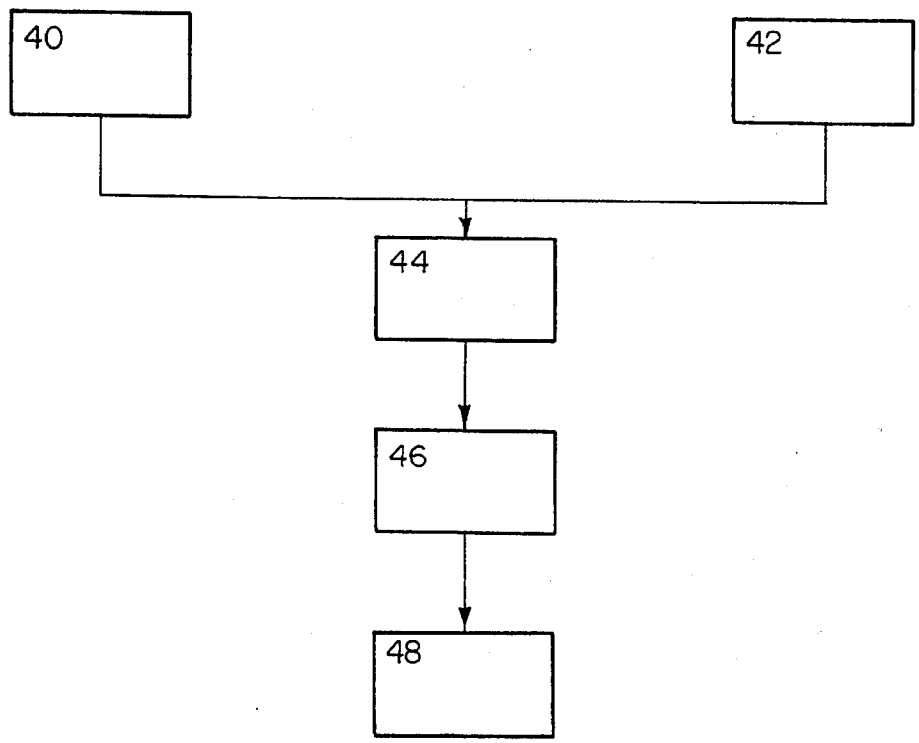
FIG. 4 is a flow chart illustrating a method for carrying out the invention.

FIGS. 3 and 4 show the object or decorative container 22 including a structure that forms an aperture or slot 26 sized for insertion of a reward token 28 into the decorative container. The reward token is preferably a coin, as shown in FIG. 3, but may be any appropriate item that the child regards as a reward, such as candy, personalized good-conduct tokens, or the like. After the child has completed a successful toilet activity or toilet training experience, he or she is given a reward token for placing into the object to produce the musical sounds.

The aperture 26 is formed in a sleeve portion 27 having an outer dimension sized to fit within a corresponding aperture 25 of the container 22. The sleeve portion 27 also includes an inner dimension sized to permit passage of the token or coin 28 therethrough. A flange 29 holds the sleeve 27 within the aperture 25.

Referring still to FIG. 3, the sleeve incorporates a switch 30, shown here as an electrical spring-type switch, that closes an electrical circuit of a sound emitting device in the form of an electronic music generator 32 in response to the coin 28 passing through the sleeve. The electronic music generator 32, upon closure of the electrical circuit, initiates an electronically generated musical sound (e.g., the song "Twinkle Twinkle Little Star").

The musical response can be produced by any suitable sound or music generator for generating the musical sound. Without limitation, the sound generator may comprise an electronic integrated circuit sound generator, a spring-driven clockwork or electro-mechanical music generator, or any suitable electric, mechanical or pneumatic sound-emitting device.

The musical sounds result from the placement of a reward token in the container by the child after having successfully completed an appropriate toilet training experience. Exactly what constitutes a successful toilet training experience depends upon many factors including the child's the age, maturity, and personality. For younger children, just sitting on a closed toilet seat may constitute such an experience. For older children, the toilet training experience may include sitting on and using the child toilet. Other examples include emptying the child toilet into the adult toilet, flushing the adult toilet, and washing hands. For even older children, the training experience may involve use of the adult toilet.

The child gains an additional positive reenforcement in the toilet training experience by placing reward tokens into the decorative object. As mentioned, the decorative object produces a musical response upon insertion of a reward token into the object. The musical response may comprise an enjoyable musical tune familiar to the child. The musical sound may be any combination of audible sounds designed to please the child. Preferably, the musical sound is a tune (e.g., a children's song). Alternatively, the sound may be, for example, an animal or machine sound.

After several tokens or coins 28 are placed in the container 22, a collection 36 of coins results. When the decorative container is full of reward tokens, the child may be further rewarded by removing the collection of tokens or coins and "cashing in" the reward tokens. For example, without limitation, the child may be allowed to use the tokens to purchase a treat or surprise, or to receive an alternative reward. The collection of tokens or coins can be removed by extracting a conventional rubber plug 38 from the bottom of the container 22.

FIG. 4 shows a flow diagram of preferred steps that may be used to carry out a method according to the present invention. The preferred method involves steps of providing a toilet appropriate for use by the child (box 40) and a decorative container (box 42). The decorative container should be within close proximity to toilet such that the child associates the container visually and mentally with the toilet. After an appropriate toilet activity, the child is given a reward token (box 42). The child then places the reward token into a slot in the container (box 46). As described above, a switch actuated by the token causes a musical response to sound upon insertion of the coin into the decorative container (box 48).

Many positive incentives are provided to the child through use of the method and apparatus of the present invention. All work toward making the toilet training experience more enjoyable and comfortable for the child. Some of these incentives include providing a lovable, pleasurable object adjacent the toilet, giving a reward token to the child upon completion of the toilet activity, placing the token into the object to elicit a musical response, and receiving a big reward upon cashing in on the collection of the reward tokens.

In addition to the above-mentioned incentives, the method of the present invention encourages use of traditional incentives for toilet training, without materially changing the positive characteristics of the present invention. Examples of traditional incentives include clapping hands and giving appropriate verbal praise, encouragement, and compliments. A further advantage that contributes to the success of the present method is that the reward system is designed to be given preferably upon completion of the appropriate toilet training experience. In particular, the musical response preferably occurs not upon initiation or during the toilet activity, but after the activity is completed. In addition, the apparatus and method are not limited to any particular toilet activity, but are applicable for any activity that the adult care giver may consider appropriate.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

I claim:

1. A method of training a child to complete a toilet training experience, comprising the steps of:

providing a toilet for toilet training a child;

providing an object adjacent the toilet, the object including a device for emitting a musical sound;

rewarding the child with a token upon completion of an appropriate toilet activity by the child;

placing the token into the object;

causing the musical sound to be emitted from the object in response to placing the token into the object.

2. A method of toilet training according to claim 1, further comprising the steps of:

placing a sufficient number of tokens in the object to form a collection of tokens;

removing the collection of tokens from the object;

rewarding the child with the collection of tokens.

3. A method of toilet training according to claim 1 wherein the object is in the form of an animal, and further comprising the step of allowing the child to recognize the animal prior to the toilet training experience to facilitate toilet training.

4. A method of toilet training according to claim 1 wherein the object is in the form of a pig, and further comprising the step of allowing the child to recognize the pig prior to the toilet training experience to facilitate toilet training.

5. A method of toilet training according to claim 1 wherein the object includes a slot for receiving the token and a switch coupled to the slot, and further comprising the step of actuating the switch upon placing the token into the object to cause the musical sound to be emitted from the object.

6. A method of toilet training according to claim 1, further comprising the step of providing praise to the child upon completion of a toilet training activity.

7. A method of toilet training a child according to claim 1, further comprising the step of visually associating the object with the toilet training experience.

8. A method of toilet training a child according to claim 1, further comprising the step of audibly associating the musical sound with the toilet training experience.

9. A method of toilet training a child according to claim 1, further comprising the steps of:

visually associating the object with the toilet training experience;

audibly associating the musical sound with the toilet training experience.

10. A method for toilet training a child, comprising the steps of:

providing a toilet for toilet training a child;

providing an animal shaped object adjacent the toilet, the object including a device for emitting a musical sound;

allowing the child to recognize the object prior to toilet training to facilitate toilet training;

rewarding the child with a token upon completion of an appropriate toilet activity by the child;

placing the token into the object;

causing the musical sound to be emitted from the object in response to placing the token into the object;

providing verbal praise to the child upon completion of a toilet training activity.

11. A method of toilet training according to claim 10, further comprising the steps of:

placing a sufficient number of tokens in the object to form a collection of tokens;

removing the collection of tokens from the object;

rewarding the child with the collection of tokens.

12. A method of toilet training a child according to claim 10, further comprising the step of visually associating the object with the toilet training experience.

13. A method of toilet training a child according to claim 10, further comprising the step of audibly associating the musical sound with the toilet training experience.

14. A method of toilet training a child according to claim 10, further comprising the steps of:

visually associating the object with the toilet training experience;

audibly associating the musical sound with the toilet training experience.

* * * * *